Oct. 17, 1933. C. E. BROOK 1,931,315
STRIP MATERIAL AND METHOD OF MAKING THE SAME
Filed Oct. 27, 1932
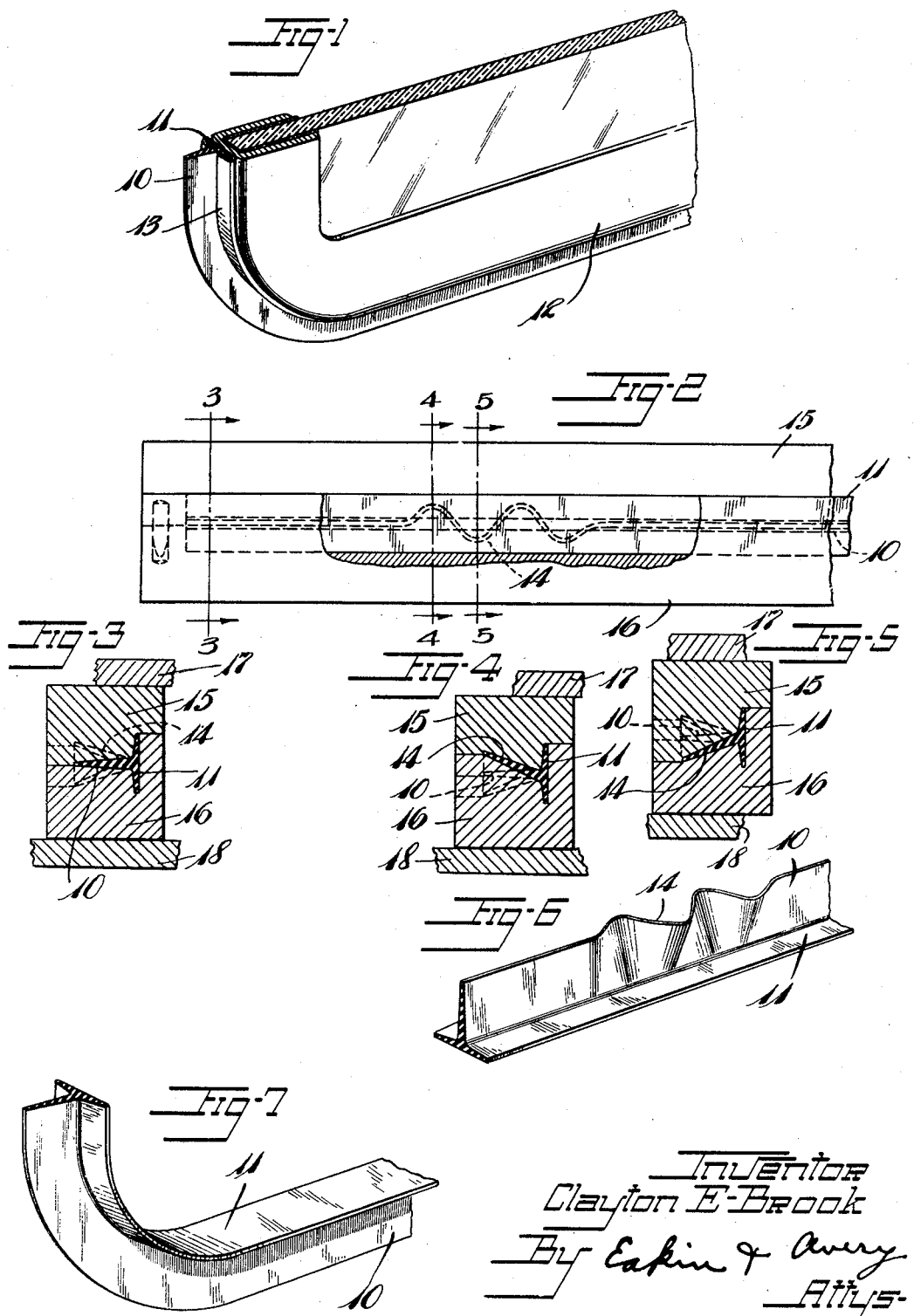

Patented Oct. 17, 1933

1,931,315

UNITED STATES PATENT OFFICE 1,931,315

STRIP MATERIAL AND METHOD OF MAKING THE SAME

Clayton E. Brook, Akron, Ohio, assignor to The B. F. Goodrich Company, New York, N. Y., a corporation of New York Application October 27, 1932. Serial No. 639,781

7 Claims. (Cl. 20—69)

This invention relates to the manufacture of strip material, such as weather stripping, and its chief object is the provision of a strip which, although it may be of complex cross-sectional shape, is adapted to be bent without causing objectionable tension in the strip by such distortion, and without requiring the use of such expedients as notching or pleating the strip for the bending. A further object is to provide for the convenient manufacture of such strip material.

These and further objects will be apparent from the following description, reference being had to the accompanying drawing, in which:

Fig. 1 is a perspective view, with parts in section, of a corner of a vehicle window having mounted thereon a T-shaped weather strip constructed according to and embodying the invention in its preferred form.

Fig. 2 is a side view, with parts broken away, of a mold constructed according to and embodying the invention, the mold having a T-shaped weather strip therein.

Figs. 3, 4 and 5 are sections taken along the lines 3—3, 4—4, and 5—5, respectively, of Fig. 2.

Fig. 6 is a perspective view of a portion of the T-shaped weather strip as it is taken from the mold.

Fig. 7 is a perspective view like that of Fig. 1 but with all parts removed except the T-shaped weather strip.

The T-shaped weather strip, comprising a flange portion 10 projecting from a base portion 11, is illustrated in Fig. 1 as applied to the edge of a window 12 of a construction commonly used in some types of automobile bodies, the weather strip being secured to the window by means of a holding element 13 secured to the window and clamping in position the base portion of the strip.

In order that the strip may be positioned around the window corner, as shown, without subjecting the flange portion 10 to objectionable tension by distortion from a more nearly straight form, more convenient for manufacture and handling, the strip is originally formed at the portion of its flange 10 that is to be bent around the window corner with a wavy portion 14 to provide the necessary amount of material at the outer side of the bent strip for the flexure thereof without stretching. Preferably, the portion 14 is formed with a gradually increasing amplitude of waviness outwardly from the base 11 so that the flange 10 may be bent to the shapes of Figs. 1 or 7 substantially without longitudinal stretching throughout its radial depth, and so that the flange of the bent strip need not have such irregulariies as pleats, folds or notches, but will be regular throughout its length.

In order that the portion 14 of the flange will not be locally bowed to one side or the other to the detriment of effective sealing when the strip is bent, despite the lateral stresses set up in the material by the bending, especially when the flange is of resilient rubber, provision is preferably made for a condition of laterally balanced stresses in the bent flange. This may be effected, for example, by the provision of an equal number of waves of substantially the same size and shape at the two sides of the flange, as shown in Figs. 2 and 6, so that the stresses tending to distort the flange to one side will be counteracted by similar but opposed stresses tending to distort the flange to the other side, resulting in the substantially balanced condition.

Any suitable material may be used, but it is preferred that the strip be of resilient rubber composition which provides a good seal and may be molded to the proper shape so that it can be caused to assume the bent form without irregularities in its structure. The avoidance of a stretched condition of the flange of the strip is advantageous especially with such a strip material as rubber which possesses greater resistance to abrasion when in an unstretched condition.

The molding of the strip may be carried out in the mold illustrated in Figs. 2 to 5, in which the mold is shown as comprising two parts 15 and 16 defining between them a cavity of the proper form to provide the desired wavy-flanged strip, these mold sections being held together during the molding operation, for example, by press platens 17 and 18.

Variations may be restored to without departing from the scope of the invention as it is defined in the following claims:

I claim:

1. A strip of material formed with a longitudinal margin and adapted to be bent in a direction away from said margin, the said margin being so formed as to be longitudinally slack in at least a portion thereof until the strip is so bent.

2. A strip as defined in claim 1 in which the slackness of the margin is progressively greater toward its outer edge.

3. A strip as defined in claim 1 in which the margin is of resilient material and is of such wavy shape that lateral stresses set up therein by the bending of the strip will be so balanced that the said margin will assume a substantially regular shape.

4. A strip as defined in claim 1 in which the margin defined is of molded rubber composition.

5. A bendable weather strip comprising an attaching base portion having a continuous rubber flange portion projecting therefrom along its length, said strip in its unbent condition being of a continuous devious shape in at least a part of said flange portion and of a substantially non-devious shape in said base portion.

6. A bendable weather strip as defined in claim 5 in which the degree of deviation of said flange portion increases gradually outward from the base portion.

7. The method of providing an exteriorly cornered structure with a strip element which method comprises forming the element of flexible material with a marginal devious portion and a substantially non-devious base portion and applying the element about the corner of the structure with the devious marginal portion positioned radially outward from the base portion of the element.

CLAYTON E. BROOK.